(12) United States Patent
McCarley et al.

(10) Patent No.: US 10,498,657 B2
(45) Date of Patent: Dec. 3, 2019

(54) SYSTEM AND METHOD FOR ACCOUNT LEVEL MAXIMUM BIT RATE ENFORCEMENT

(71) Applicant: Verizon Patent and Licensing Inc., Arlington, VA (US)

(72) Inventors: William David McCarley, Grapevine, TX (US); Barry F. Hoffner, Bridgewater, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 132 days.

(21) Appl. No.: 15/456,207

(22) Filed: Mar. 10, 2017

(65) Prior Publication Data
US 2018/0262625 A1  Sep. 13, 2018

(51) Int. Cl.
| H04L 12/801 | (2013.01) |
| --- | --- |
| H04L 12/14 | (2006.01) |
| H04L 12/807 | (2013.01) |
| H04M 15/00 | (2006.01) |
| H04W 4/24 | (2018.01) |

(52) U.S. Cl.
CPC ........ *H04L 47/193* (2013.01); *H04L 12/1407* (2013.01); *H04M 15/57* (2013.01); *H04M 15/64* (2013.01); *H04M 15/66* (2013.01); *H04M 15/75* (2013.01); *H04M 15/8228* (2013.01); *H04W 4/24* (2013.01); *H04L 47/27* (2013.01)

(58) Field of Classification Search
CPC ...... H04L 47/193; H04L 47/27; H04W 28/02; H04W 28/0263
See application file for complete search history.

(56) References Cited

U.S. PATENT DOCUMENTS

| 2011/0225281 | A1* | 9/2011 | Riley | H04L 12/14 709/223 |
| --- | --- | --- | --- | --- |
| 2013/0114408 | A1* | 5/2013 | Sastry | H04W 28/02 370/231 |
| 2014/0187195 | A1* | 7/2014 | Pallares Lopez | H04L 12/1432 455/405 |
| 2014/0355463 | A1* | 12/2014 | Smith | H04M 15/60 370/252 |
| 2016/0262073 | A1* | 9/2016 | Muley | H04L 43/0876 |
| 2017/0070915 | A1* | 3/2017 | Blankenship | H04L 47/20 |
| 2018/0262625 | A1* | 9/2018 | McCarley | H04M 15/66 |

* cited by examiner

*Primary Examiner* — Raj Jain

(57) ABSTRACT

A network device enables account-level data speed enforcement over a wireless core network. The network device obtains an account identifier for a user device requesting a session, wherein the account identifier applies to multiple user devices. The network device stores the account identifier associated with a user device identifier for the user device and an access point name (APN) identifier for the session. The network device associates the account identifier with an account aggregate maximum bit rate (AMBR) value and stores, in a memory, an entry including the account identifier, the user device identifier, and the APN identifier. The network device calculates, a per-APN AMBR value for the session, wherein the per-APN AMBR value includes a portion of the account AMBR value, and sends, to a packet data network (PDN) gateway (PGW) device, the per-APN AMBR value for the session requested by the user device.

20 Claims, 11 Drawing Sheets

FIG. 5A

| ACCOUNT ID 510 | LINE/SUBSCRIBER ID 520 | APN ID 530 | APN AMBR 540 | ACCOUNT AMBR 550 |
|---|---|---|---|---|
| 123456 | 888-555-5551 | IMS | 75 mbps | 75 mbps |

FIG. 5B

| ACCOUNT ID 510 | LINE/SUBSCRIBER ID 520 | APN ID 530 | APN AMBR 540 | ACCOUNT AMBR 550 |
|---|---|---|---|---|
| 123456 | 888-555-5551 | IMS | 37.5 mbps | 75 mbps |
| 123456 | 888-555-5551 | Internet | 37.5 mbps | 75 mbps |

FIG. 5C

| ACCOUNT ID 510 | LINE/SUBSCRIBER ID 520 | APN ID 530 | APN AMBR 540 | ACCOUNT AMBR 550 |
|---|---|---|---|---|
| 123456 | 888-555-5551 | IMS | 25 mbps | 75 mbps |
| 123456 | 888-555-5551 | Internet | 25 mbps | 75 mbps |
| 123456 | 888-555-5552 | Internet | 25 mbps | 75 mbps |

| ACCOUNT ID 510 | LINE/SUBSCRIBER ID 520 | APN ID 530 | APN AMBR 540 | ACCOUNT AMBR 550 |
|---|---|---|---|---|
| 123456 | 888-555-5551 | IMS | 18.75 mbps | 75 mbps |
| 123456 | 888-555-5551 | Internet | 18.75 mbps | 75 mbps |
| 123456 | 888-555-5552 | Internet | 18.75 mbps | 75 mbps |
| 123456 | 888-555-5552 | App | 18.75 mbps | 75 mbps |

FIG. 5D

| ACCOUNT ID 510 | LINE/SUBSCRIBER ID 520 | APN ID 530 | APN AMBR 540 | ACCOUNT AMBR 550 |
|---|---|---|---|---|
| 123456 | 888-555-5551 | IMS | 250 kbps | 1 mbps |
| 123456 | 888-555-5551 | Internet | 250 kbps | 1 mbps |
| 123456 | 888-555-5552 | Internet | 250 kbps | 1 mbps |
| 123456 | 888-555-5552 | App | 250 kbps | 1 mbps |

FIG. 5E

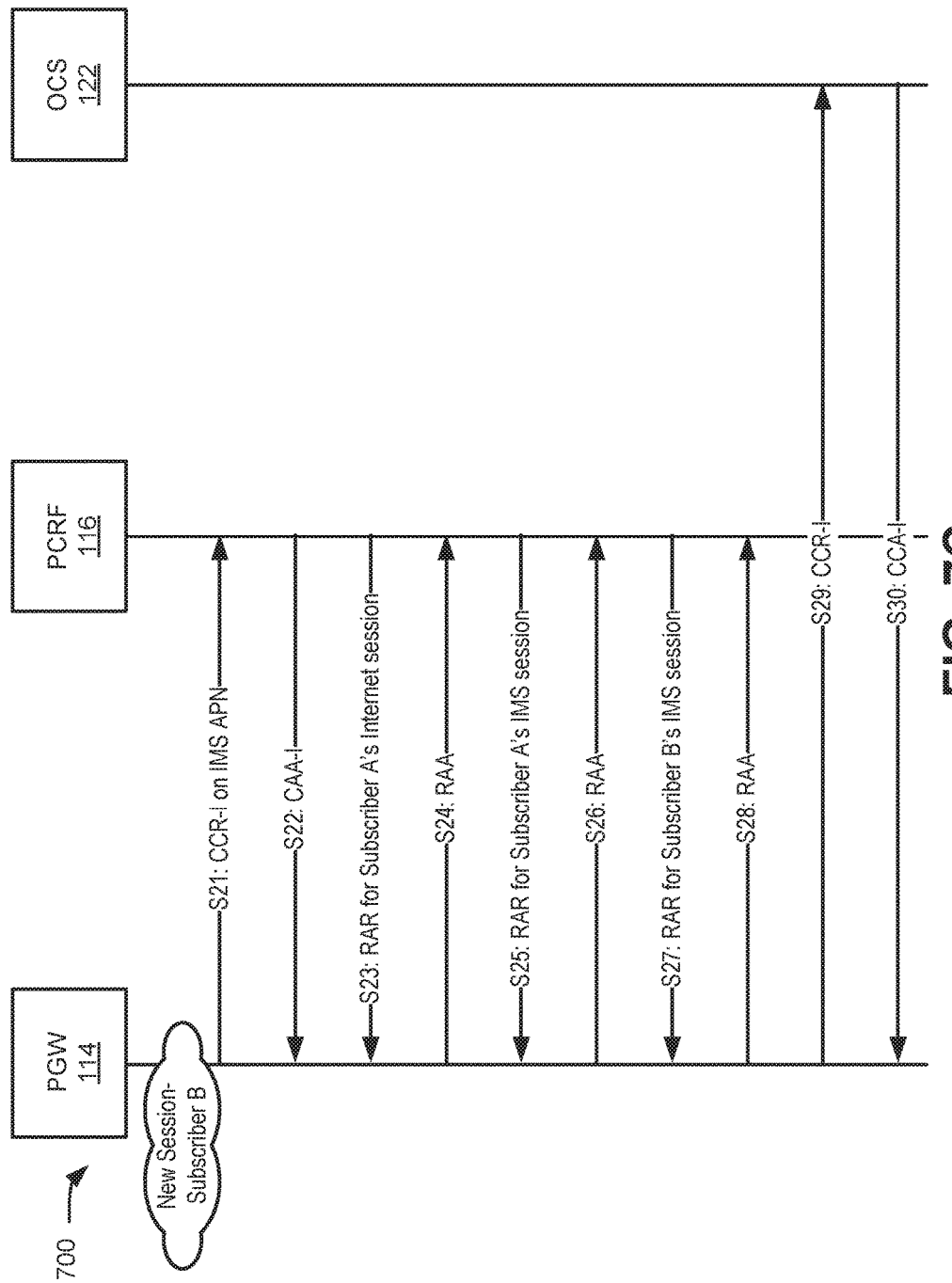

SYSTEM AND METHOD FOR ACCOUNT LEVEL MAXIMUM BIT RATE ENFORCEMENT

BACKGROUND

The telecommunications industry is moving away from a single-line usage model, and has shifted to a shared-account model. For example, service plans for wireless customers are offered at an account level that may include multiple devices under a single plan, such as a family plan or small business plan. For such plans, usage monitoring, alerting, management and billing statements are performed at the account level.

BRIEF DESCRIPTION OF THE DRAWINGS

FIGS. 5A-5E are block diagrams illustrating data structures for the maximum bit rate (MBR) management database of FIG. 1;

FIGS. 7A-7D are diagrams illustrating communication flows for implementing account-level data speed enforcement for a particular use case, according to an implementation described herein.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Shared accounts for wireless customers, such as a family plan, include a shared data allotment that is allocated on a periodic basis (e.g., monthly). Some plans may include "unlimited" data and other plans may have a monthly limit. In any event, to protect from network abuses or for other policy reasons, a service provider may limit data speeds for high volume data users. For example, when usage exceeds a certain monthly usage amount (e.g., 5 Gigabytes (GB), 20 GB, etc.), the service provider may reduce (or throttle) the maximum data speed available to a subscriber. Such throttling may, for example, discourage subscribers' careless or excessive consumption of limited wireless network resources that may result in network congestion and/or degraded service for other customers. While throttling has previously been implemented at the individual subscriber level, throttling at the account level requires dynamic communication among network elements and has not been effectively implemented.

According to implementations described herein, a network device enables account-level data speed enforcement over a wireless core network. Managing maximum data speed at the account level provides consistency with other account-level models used in wireless networks, such those currently used for usage monitoring, alerting, management, and billing. Account-level data speed enforcement may provide new ways to offer services and control/monitor network capacity. According to an implementation, the network device may obtain an account identifier for a user device requesting a session. The account identifier may apply to multiple user devices. The network device may store the account identifier associated with a user device identifier for the user device and an access point name (APN) identifier for the session. The network device may associate the account identifier with an account aggregate maximum bit rate (AMBR) value and may store in a database, an entry including the account identifier, the user device identifier, and the APN identifier. The network device may calculate a per-APN AMBR value for the session, wherein the per-APN AMBR value includes a portion of the account AMBR value, and may send, to a packet data network (PDN) gateway (PGW) device, the per-APN AMBR for the session requested by the user device.

Figure 1:
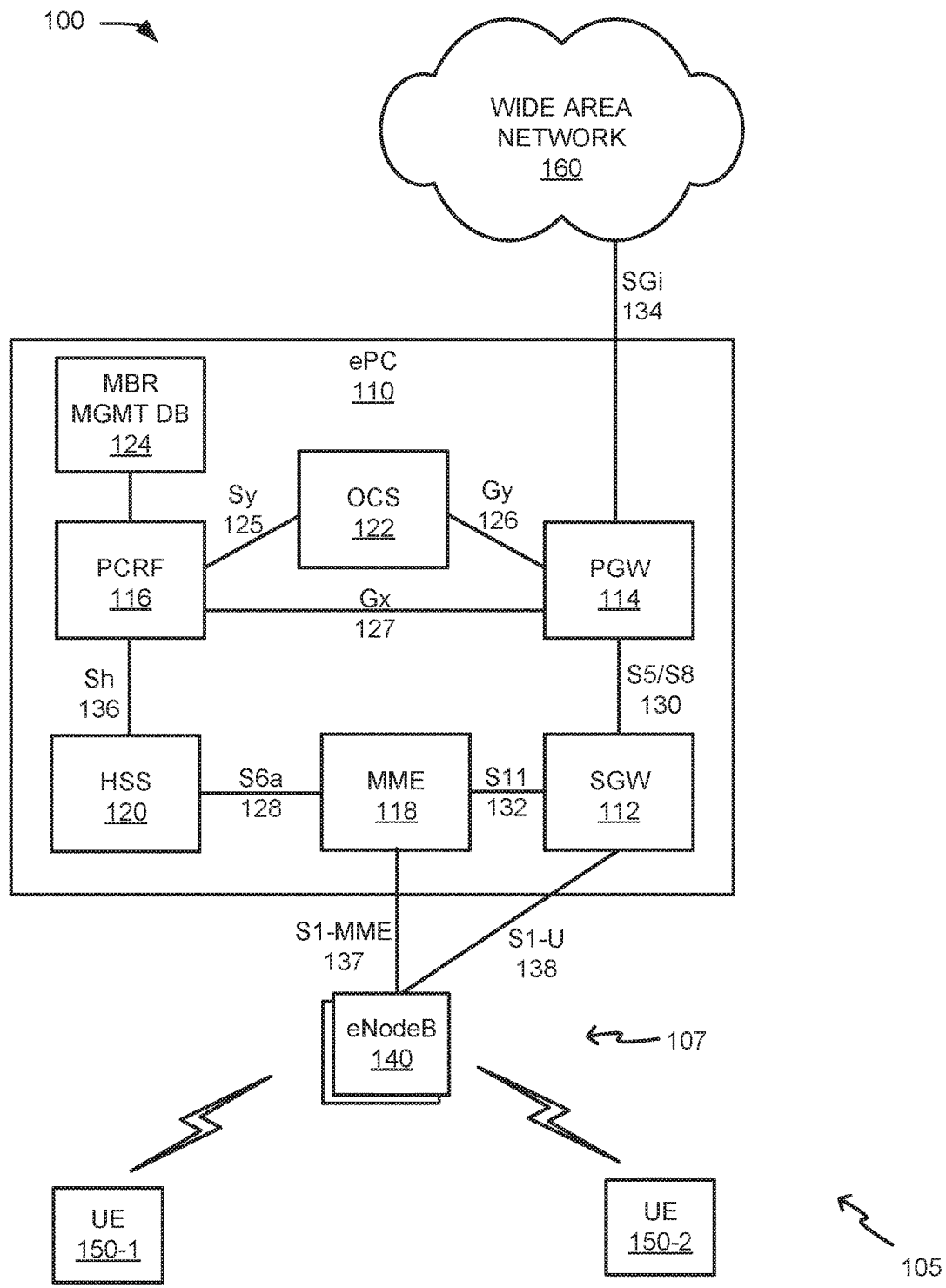
FIG. 1 is a block diagram of an exemplary network in which systems and methods described herein may be implemented.

FIG. 1 is a block diagram of an exemplary network 100 in which systems and methods described herein may be implemented. Network 100 may include wireless network 105, and a Wide Area Network (WAN) 160. While wireless network 105 is shown in the context of a Long Term Evolution (LTE) network, it should be appreciated that embodiments presented herein may operate in any appropriate wireless network(s) such for example, 3G networks, LTE/4G networks, or 5G networks.

Wireless network 105 may include one or more devices that are physical and/or logical entities interconnected via standardized interfaces. Wireless network 105 provides wireless packet-switched services and wireless Internet Protocol (IP) connectivity to mobile devices to provide, for example, data, voice, and/or multimedia services.

Wireless network 105 may further include one or more mobile devices, such as, for example, user equipment (UEs) 150-1 and 150-2 (collectively referred to as "UE 150" and generically as "UE 150," and also referred to as a "user device"). Wireless network 105 may include one or more evolved Packet Cores (ePC) 110 and evolved Universal Mobile Telecommunications System (UMTS) Terrestrial Radio Access Networks (eUTRAN) 107.

ePC 110 (also referred to as a wireless core network) may include one or more serving gateways (SGW) 112, packet data network (PDN) gateways (PGW) 114, Policy and Charging Rules Function (PCRF) devices 116 (also referred to herein simply as "PCRF 116"), mobility management entity (MME) devices 118, home subscriber server (HSS) devices 120, an online charging system (OCS) device 122 (also referred to herein simply as "OCS 122"), and a maximum bit rate (MBR) management database 124. The eUTRAN 107 may include one or more base stations, such as, for example, eNodeB 140.

It is noted that FIG. 1 depicts a representative network 100 with exemplary components and configuration shown for purposes of explanation. Other embodiments may include additional or different network entities in alternative configurations than those which are shown in FIG. 1.

Further referring to FIG. 1, each eNodeB 140 may include one or more devices and other components having functionality that allows UE 150 to wirelessly connect to eUTRAN 107. eNodeB 140 may interface with ePC 110 via an S1 interface, which may be split into a control plane S1-MME interface 137 and a data plane S1-U interface 138. S1-MME interface 137 may interface with MME device 118.

S1-MME interface 137 may be implemented, for example, with a protocol stack that includes a Network Access Server (NAS) protocol and/or Stream Control Transmission Protocol (SCTP). S1-U interface 138 may interface with SGW 112 and may be implemented, for example, using a General Packet Radio Service Tunneling Protocol version 2 (GTPv2). eNodeB 140 may communicate with other eNodeBs via an X2 interface (not shown). The X2 interface may be implemented, for example, with a protocol stack that includes an X2 application protocol and SCTP.

SGW 112 may provide an access point to and from UE 150, may handle forwarding of data packets for UE 150, and may act as a local anchor point during handover procedures between eNodeBs 140. SGW 112 may interface with PGW 114 through an S5/S8 interface 130. S5/S8 interface 130 may be implemented, for example, using GTPv2.

PGW 114 may function as a gateway to WAN 160 through a SGi interface 134. WAN 160 may include, for example, an Internet Protocol (IP) Multimedia Subsystem (IMS) network, which may provide voice and multimedia services to UE 150, based on Session Initiation Protocol (SIP). In some cases, a particular UE 150, while connected to a single SGW 112, may be connected to multiple PGWs 114, one for each packet network with which UE 150 communicates. PGW 114 may enforce policies from PCRF 116, such as uplink and downlink data speeds (Aggregate MBR or AMBR), for individual sessions by a UE 150. For example, PGW 114 may control data speeds per subscriber and per APN.

PCRF 116 provides policy control decision and flow based charging control functionalities. PCRF 116 may include a network device, server device, or a distributed component. PCRF 116 may provide network control regarding service data flow detection, gating, quality of service (QoS) and flow based charging, etc. PCRF 116 may determine how a certain service data flow shall be treated, and may ensure that traffic mapping and treatment is in accordance with a user's subscription profile. According to implementations described herein, PCRF 116 may generate and update policies to accomplish these tasks based on business logic provided to PCRF 116. PCRF 116 may communicate with PGW 114 using a Gx interface 127 to dynamically implement policies for UEs 150. Gx interface 127 may be implemented, for example, using a Diameter protocol.

Still referring to FIG. 1, multiple elements in ePC 110 perform various functions for implementing QoS and policy management, such as data speed management. As noted above, PCRF 116 may be the policy server in ePC 110. PCRF 116 may take the available network information and operator-configured policies to create service session-level policy decisions. The decisions, known as Policy and Charging Control (PCC) rules, are forwarded to a policy and charging enforcement function (PCEF) (not shown) located in PGW 114. The PCEF in PGW 114 enforces policy decisions by establishing bearers, mapping service data flows to bearers, and performing traffic policing and shaping.

MME device 118 may implement control plane processing for wireless network 105. For example, MME device 118 may implement tracking and paging procedures for UE 150, may activate and deactivate bearers for UE 150, may authenticate a user of UE 150, and may interface to non-LTE radio access networks. MME device 118 may communicate with SGW 112 through an S11 interface 132. S11 interface 132 may be implemented, for example, using GTPv2. S11 interface 132 may be used to create and manage a new session for a particular UE 150. S11 interface 132 may be activated when MME device 118 needs to communicate with SGW 112, such as when the particular UE 150 attaches to ePC 110, when bearers need to be added or modified for an existing session for the particular UE 150, when a connection to a new PGW 114 needs to created, or during a handover procedure (e.g., when the particular UE 150 needs to switch to a different SGW 112).

HSS device 120 may store information associated with UEs 150 and/or information associated with users of UEs 150. For example, HSS device 120 may store user profiles, such as a Subscriber Profile Repository (SPR), that include authentication and access authorization information. MME device 118 may communicate with HSS device 120 through an S6a interface 128. S6a interface 128 may be implemented, for example, using a Diameter protocol. PCRF 116 may communicate with HSS device 120 through an Sh interface 136 to obtain a subscriber profile that identifies services (e.g., a prepaid voice service, a prepaid data service, a postpaid voice service, a postpaid data service, a prepaid voice-over-IP service, etc.) to which a user, associated with UE 150, has subscribed. The subscriber profile may also identify particular services, to which the user has subscribed, that are to be provided when an online charging action is to be performed.

OCS 122 is a credit management system that may affect, in real-time, services provided to UE 150. OCS 122 may store account settings, such a data usage plan limits, for individual accounts. Some accounts may include multiple subscribers (e.g., multiple UEs 150). OCS 122 may log data usage per account and/or per subscriber. PCRF 116 may interact with OCS 122 to check credit and report credit status over a Sy interface 125, implemented, for example, using a Diameter protocol.

MBR management database 124 may include a data structure for associating active subscribers and sessions that are using ePC 110 with an account. All PCRF devices 116 in wireless network 105 may have read and write access to MBR management database 124. In one embodiment, MBR management database 124 may include individual entries with an account identifier, a subscriber identifier (e.g., a mobile directory number (MDN) for UE 150), an APN identifier for a session, and an AMBR for the APN (also referred to as an "APN-AMBR). In another implementation, instead of a central database, MBR management database 124 may be a distributed database on each PCRF 116, and the database on each PCRF 116 is synchronized automatically across all PCRF devices 116 whenever there is an entry change.

UE 150 may include any mobile device configured to communicate with eNodeB 140 via wireless signals. For example, UE 150 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a media playing device; a portable gaming system; and/or any type of mobile device with wireless communication capability. Each UE 150 may typically be associated with a subscriber, and the subscriber may be associated with a wireless account managed by a service provider for wireless network 105. An account may include a single subscriber or multiple subscribers.

WAN 160 may include any type of wired or wireless network covering larger areas. For example, WAN 160 may include a metropolitan area network (MAN), a Public Switched Telephone Network (PSTN), an IMS network, an ad hoc network, an intranet, the Internet, a fiber optic-based network, a wireless network, and/or a combination of these or other types of networks. WAN 160 may be an IP based network or utilize Multi-Protocol Label Switching (MPLS), and may include a mesh network (e.g., IEEE 801.11s) and/or or a WiMAX network (e.g., IEEE 802.16). WAN 160 may include one or more circuit-switched networks and/or packet-switched networks.

While FIG. 1 shows exemplary components of network 100, in other implementations, network 100 may include fewer components, different components, differently arranged components, or additional components than depicted in FIG. 1. Additionally or alternatively, one or more components of network 100 may perform functions described as being performed by one or more other components.

Figure 2:
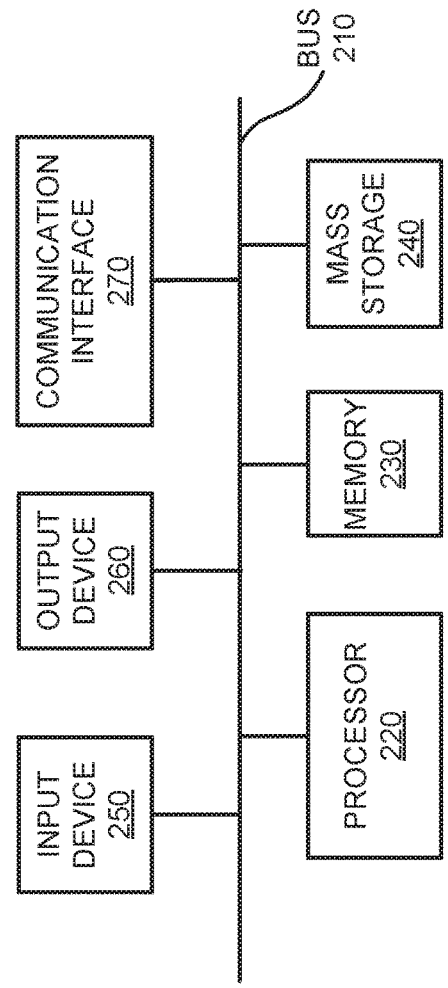
FIG. 2 is a block diagram showing exemplary components of a network device in the environment of FIG. 1.

FIG. 2 is a block diagram showing exemplary components of a network element 200, such as, for example, a PCRF 116, according to an embodiment. Network element 200 may include a bus 210, a processor 220, a memory 230, mass storage 240, an input device 250, an output device 260, and a communication interface 270.

Bus 210 includes a path that permits communication among the components of network element 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic. For example, processor 220 may be an x86 based CPU, and may use any operating system, which may include varieties of the Windows, UNIX, and/or Linux. Processor 220 may also use high-level analysis software packages and/or custom software written in any programming and/or scripting languages for interacting with other network entities that are communicatively coupled to network 100.

Memory 230 may include any type of dynamic storage device that may store information and/or instructions, for execution by processor 220, and/or any type of non-volatile storage device that may store information for use by processor 220. For example, memory 230 may include a RAM or another type of dynamic storage device, a ROM device or another type of static storage device, and/or a removable form of memory, such as a flash memory. Mass storage device 240 may include any type of on-board device suitable for storing large amounts of data, and may include one or more hard drives, solid state drives, and/or various types of (RAID) arrays.

Input device 250, which may be optional, can allow an operator to input information into network element 200, if required. Input device 250 may include, for example, a keyboard, a mouse, a pen, a microphone, a remote control, an audio capture device, an image and/or video capture device, a touch-screen display, and/or another type of input device. In some embodiments, network element 200 may be managed remotely and may not include input device 250. Output device 260 may output information to an operator of network element 200. Output device 260 may include a display, a printer, a speaker, and/or another type of output device. In some embodiments, network element 200 may be managed remotely and may not include output device 260.

Communication interface 270 may include a transceiver that enables network element 200 to communicate within network 100 with other devices and/or systems. The communication interface 270 may be configured for wireless communications (e.g., radio-frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 270 may include a transmitter that converts baseband signals to RF signals and/or a receiver that converts RF signals to baseband signals.

As described below, network element 200 may perform certain operations relating to server (e.g., PCRF 116) and/or gateway operations when embodied as a gateway (e.g., PGW 114), and/or providing user use and service information when embodied as OCS 122. Network element 200 may perform these operations in response to processor 220 executing software instructions contained in a computer-readable medium, such as memory 230 and/or mass storage 240. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein, such as, for example, process 600 depicted in FIG. 6. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of network element 200, in other implementations, network element 200 may include fewer components, different components, additional components, or differently arranged components than depicted in FIG. 2.

Figure 3:
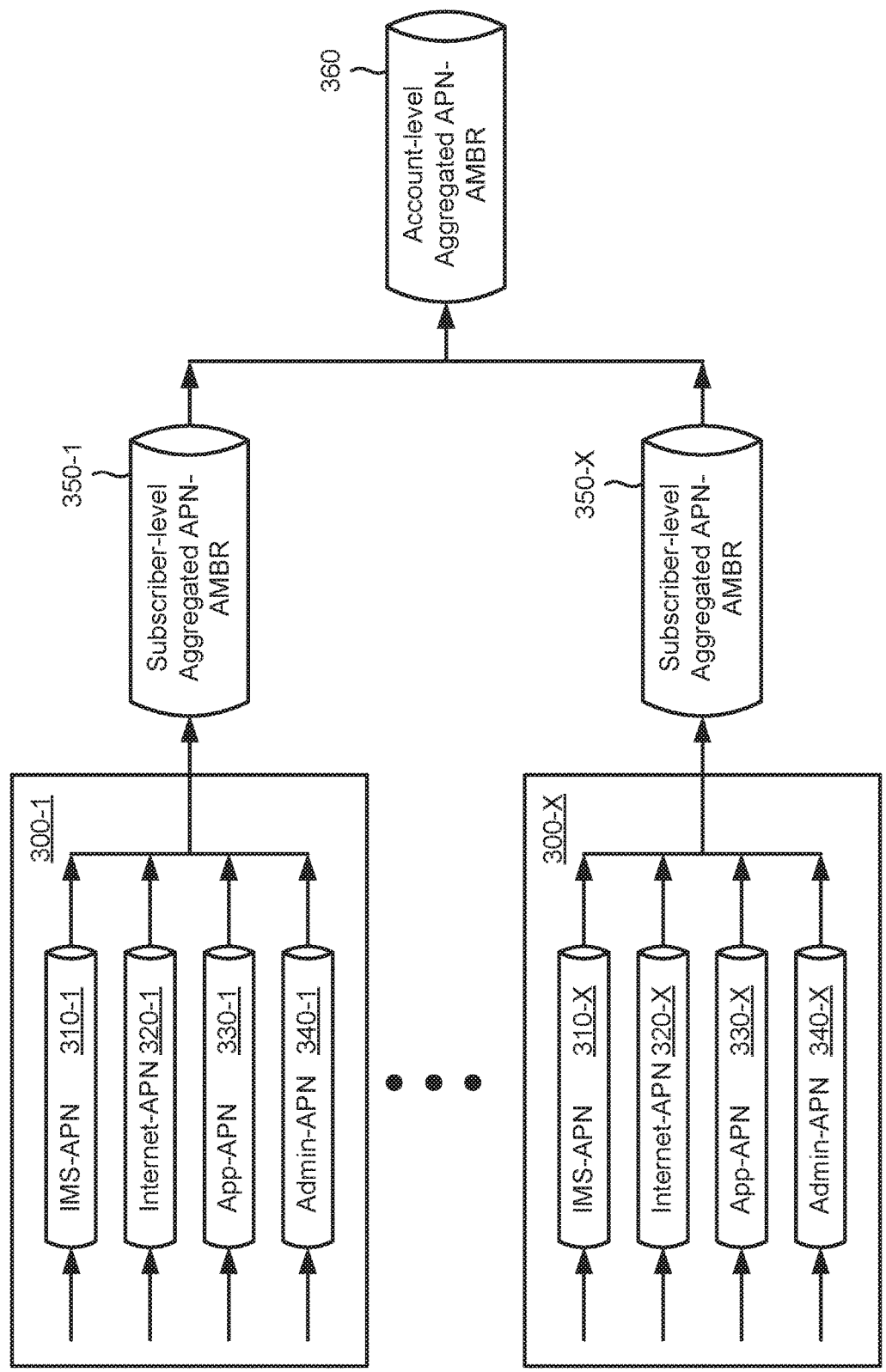
FIG. 3 is a diagram illustrating data speed enforcement at an account level according to an implementation described herein.

FIG. 3 is a diagram illustrating data speed enforcement at an account level according to an implementation described herein. Data use over ePC network 110 may be tracked for individual subscribers. One or more individual subscriber devices (e.g., UE 150) may be associated with a shared account. A log of data use by each subscriber 300-1 through 300-X may be dynamically tracked by network devices in ePC 110, such as OCS 122. Data for an individual subscriber 300 may be provided via tunnels 310-340 for different APNs, depending on the type of data. For example, data for voice-over-IP calls may be sent via IMS-APN tunnel 310; data for web browsing may be sent via Internet-APN tunnel 320; data for applications on UE 150 may be sent via app-APN tunnel 330; and control data may be sent via admin-APN tunnel 340.

According to a service provider policy, data speeds for an account (e.g., a group of subscribers) may be throttled in certain use cases. Data speeds may be throttled at the APN level (e.g., over any of tunnels 310-340) for each device. In the example of FIG. 3, assume subscribers 300-1 through 300-X are associated with a single account (where "X" represents the number of subscriber devices in the account). An AMBR may be assigned to each active tunnel 310-340, such that a cumulative AMBR of each tunnel 310-340 for subscriber 300-1 is calculated as a subscriber-level aggregated APN-AMBR 350-1. Similarly, a cumulative AMBR of each tunnel 310-340 for subscriber 300-X is calculated as a subscriber-level aggregated APN-AMBR 350-X. An account-level aggregated APN-AMBR 360 may be the cumulative value of subscriber-level aggregated APN-AMBRs 350-1 through 350-X.

According to an implementation described herein, a throttled data speed (e.g., 1 megabytes per second (Mbps), 10 Mbps, 75 Mbps, etc.) may be assigned to an account, and the available bandwidth may be distributed over the total number of active sessions that are subject to the throttling policy among subscriber devices (e.g., UEs 150) in the account. For example, account-level aggregated APN-AMBR 360 may be set to 10 Mbps. If there were five active session (e.g., over tunnels 310-1, 320-1, 330-1, 310-X, and 320-X) among subscribers 300-1 through 300-X, each of tunnels 310-1, 320-1, 330-1, 310-X, and 320-X would be assigned an AMBR of 2 Mbps.

In some implementations, data over admin-APN tunnel 340 may not be throttled for quality purposes. Thus, an AMBR could be assigned only to each of active tunnels 310-330 (e.g., specifically excluding admin-APN tunnel 340).

In another implementation, a throttled data speed may be assigned to an account, and the available bandwidth may be shared over the total number of attached subscriber devices in the account. For example, if account-level aggregated APN-AMBR 360 was again set to 10 Mbps and two subscribers 300 were attached to ePC network 110, each subscriber device 300 would be assigned an AMBR of 5 Mbps regardless of the number of active sessions associated with each of the subscribers.

Figure 4:
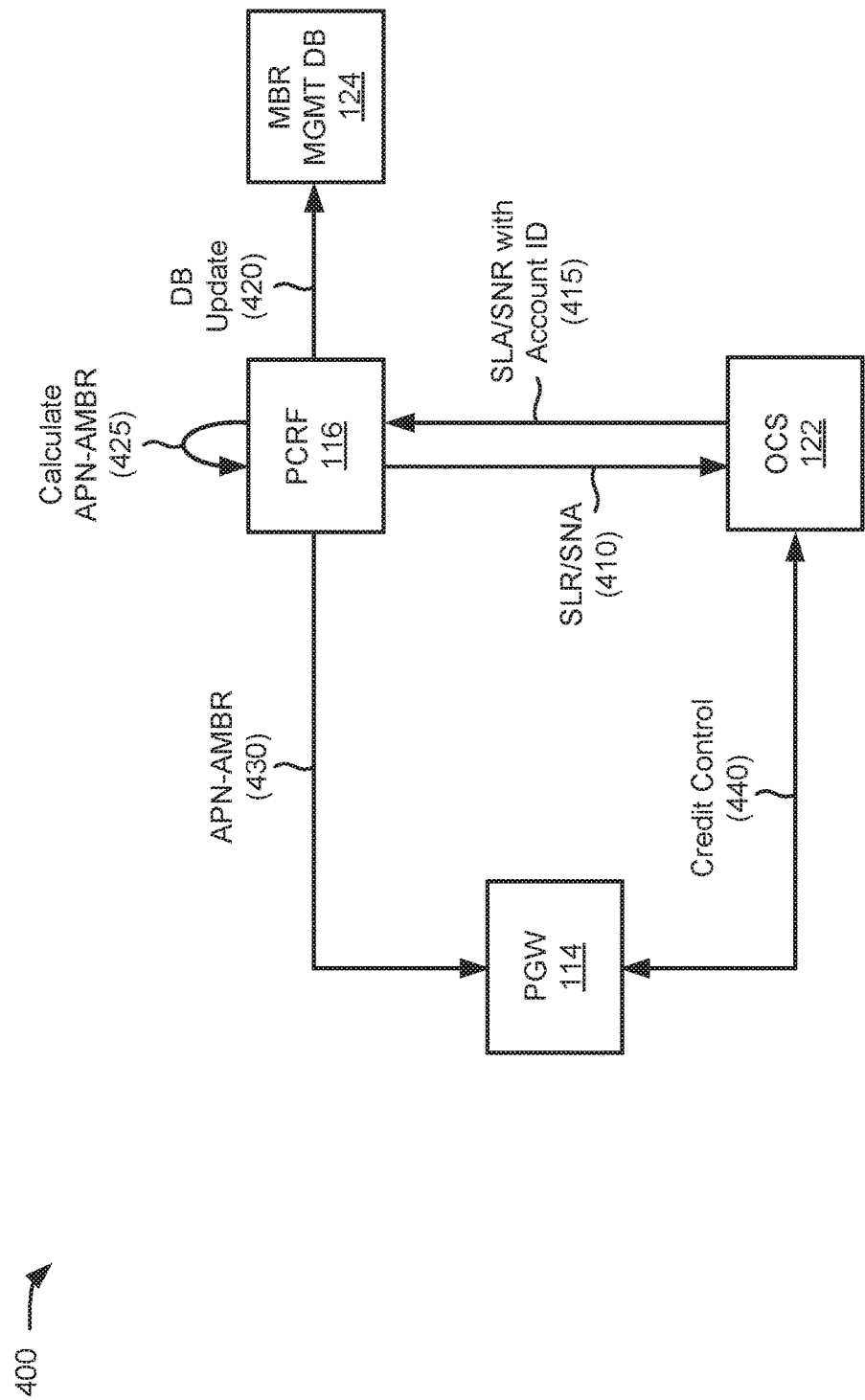
FIG. 4 is a diagram illustrating exemplary communications to apply account level data speed enforcement in a portion of the network environment of FIG. 1.

FIG. 4 is a diagram illustrating a simplified example of communications in a portion 400 of network 100. Communications in FIG. 4 may be used to apply account level data speed enforcement for devices attached to ePC network 110. As shown in FIG. 4, network portion 400 may include PGW 114, PCRF 116, OCS 122, and MBR management database 124.

With a UE 150 attached to ePC network 110, PCRF 116 may initiate a Sy interface session with OCS 122 and submit a Spending-Limit-Request (SLR) message 410. OCS 122 may respond to message 410 by providing to PCRF 116 a corresponding Spending-Limit-Answer (SLA) message 415 for UE 150. Additionally, or alternatively, OCS 122 may initiate a Sy interface session with PCRF 116 and submit a Spending-Status-Notification-Request (SNR) message 415 message. PCRF 116 may respond to message 415 by providing to OCS 122 a corresponding Spending-Status-Notification-Answer (SNA) message 410. Message 415 (e.g., either an SLA or an SNR) may also include an account identifier for an account to which UE 150 belongs. According to one implementation, a new attribute value pair (AVP), referred to as an "OCS-Account-ID AVP," is introduced into SLA/SNR message 415 to provide the account identifier. Diameter Sy protocol standards may be modified to include the OCS-Account-ID AVP. Accordingly, PCRF 116 and OCS 122 may be configured to support the OCS-Account-ID AVP within, for example, SLA and SNR commands. For example, in response to receiving a mobile station international subscriber directory number (MSISDN) in SLR message 410, OCS may send an SLA message 415 with the account identifier that corresponds to the MSISDN in the OCS-Account-ID AVP (e.g., along with information in other supported AVPs for the SLA). Thus, OCS 122 may pass account information for UE 150 to PCRF 116 via the new OCS-Account-ID AVP for the Sy interface.

PCRF 116 may store the account identifier received from OCS 122 and determine the MBR assigned to this account. As indicted by reference 420, PCRF 116 may write the account ID, a UE identifier (e.g., an MDN, MSISDN, etc.), and APN information into MBR management database 124. PCRF 116 may dynamically calculate 425 the APN-AMBR for each active line/subscriber under the same account identifier when a new APN session request is received by using MBR management database 124. PCRF 116 may allocate a subset of the total MBR for the account to an APN-AMBR for each active session. These dynamic calculations are described further below in connection with, for example, FIGS. 5A-5E.

PCRF 116 may pass the calculated APN-AMBR 430 (for UE 150) to PGW 114 using, for example, a Gx interface. PGW 114 will enforce the APN-AMBR at a per APN, per subscriber level. PGW 114 and OCS 122 may exchange a credit control messages 440, such as a credit control request (CCR) and a credit control answer (CCA), via a Gy interface 126 for managing quotas for the particular UE 150 and APN. Gy interface 126 may be implemented, for example, using a Diameter protocol. As described further herein, similar communications may be repeated when other UEs 150 request new sessions over wireless network 105, and MBR management database 124 may be dynamically updated to provide account-level data speed enforcement.

FIGS. 5A-5E are examples of a data structure in MBR management database 124 that may be used to dynamically calculate the APN-AMBR for each active line/subscriber under the same account identifier. Referring collectively to FIGS. 5A-5E, data structure 500 may represent a portion of MBR management database 124 associated with a single account. Data structure 500 may include an account identifier (ID) field 510, a line/subscriber field 520, an APN-ID field 530, and APN-AMBR field 540, an account AMBR field 550, and a variety of records or entries 560-563 associated with each of fields 510-550.

Account identifier (ID) field 510 may include a unique account number that may be associated with one or more subscribers. Line/subscriber field 520 may include a unique identifier for a particular UE 150 associated with an account in account identifier field 510. For instance, line/subscriber field 520 may include a MDN, a mobile identification number (MIN), a mobile equipment identity (MEID), an international mobile equipment identity (IMEI), an International Mobile Subscriber Identity (IMSI), etc.

APN ID field 530 may include a type of APN for a session used by a device in line/subscriber field 520. An APN identifier may include an indicator for any one of different APNs used by a service provider for different types of sessions. For example, different APN identifiers may include an IMS APN for IMS-based services, Internet APN for internet/web-based services, Admin APN for administrative/control functions, and App APN for applications/application programming interface (API) calls.

APN-AMBR field 540 may include a designation for an aggregated maximum bit rate used for the corresponding combination of account ID, line/subscriber ID, and APN ID in account identifier field 510, line/subscriber field 520, and APN ID field 530. The value for APN-AMBR field 540 may be calculated by PCRF 116 based on, for example, the number of active sessions across all subscribers for an account. Account AMBR field 550 may include a value for the current AMBR assigned to a particular account in account identifier field 510 and shared among the different subscriber in line/subscriber fields 520. In one implementation, the value account AMBR field 550 may vary based on policy factors, such as whether an account has exceeded a periodic (e.g., monthly) data use level.

Referring to FIG. 5A, PCRF 116 may generate an entry 560 for data structure 500 in which a UE 150 (e.g., UE 150-1 having an MDN of "888-555-5551" in line/subscriber field 520) requesting an IMS session (APN ID is "IMS" in APN ID field 530) is associated with an account ID ("123456" in account identifier field 510). The account AMBR is assigned 75 Mbps, as shown in account AMBR field 550. Since only one entry is associated with account 123456, PCRF 116 may allocate all 75 Mbps from AMBR field 550 to APN AMBR field 540.

Referring to FIG. 5B, after entry 560 is complete, UE 150-1 may request an internet session (e.g., operating concurrently with the IMS session). PCRF 116 may generate an entry 561 for data structure 500 with an entry of "123456" in account identifier field 510, an account ID of "888-555-5551" in line/subscriber field 520, and an APN ID of "Internet" in APN ID field 530. The value for account AMBR field remains at 75 Mbps for the account. With two entries (e.g., entries 560 and 561) associated with account 123456, PCRF 116 may allocate the 75 Mbps from AMBR field 550 equally at 37.5 Mbps in APN AMBR fields 540 for each entry 560 and 561.

Referring to FIG. 5C, after entry 561 is complete, another UE (e.g., UE 150-2) may request an internet session. Based on a message (e.g., message 415, FIG. 4) PCRF 116 may associate UE 150-2 with the same account as used for UE 150-1. PCRF 116 may generate an entry 562 for data structure 500 with an entry of "123456" in account identifier field 510, an account ID of "888-555-5552" in line/subscriber field 520, and an APN ID of "Internet" in APN ID field 530. The value for account AMBR field remains at 75 Mbps for the account. With three entries (e.g., entries 560, 561, 562) now associated with account 123456, PCRF 116 may allocate the 75 Mbps from AMBR field 550 equally at 25 Mbps in APN AMBR fields 540 for each entry 560, 561, and 562.

Referring to FIG. 5D, after entry 560 is complete, an app for UE 150-2 may request a session for API calls (e.g., operating concurrently with the internet session for UE 150-2). PCRF 116 may generate a new entry 563 for data structure 500 with an entry of "123456" in account identifier field 510, an account ID of "888-555-5552" in line/subscriber field 520, and an APN ID of "App" in APN ID field 530. The value for account AMBR field remains at 75 Mbps for the account. With four entries (e.g., entries 560, 561, 562, and 563) associated with account 123456, PCRF 116 may allocate the 75 Mbps from AMBR field 550 equally at 18.75 Mbps in APN AMBR fields 540 for each entry 560, 561, 562, and 563.

Referring to FIG. 5E, after entry 563 is complete, PCRF 116 may receive an indication (e.g., from OCS 122) that an overall data usage threshold has been reached for account 123456. PCRF 116 may update all entries 560, 561, 562, and 563 for data structure 500 with an account throttling value for AMBR field 550 (e.g., 1 Mbps). PCRF 116 may allocate the 1 Mbps from AMBR field 550 equally at 250 Kbps in APN AMBR fields 540 for each entry 560, 561, 562, and 563. In another embodiment, data speed for different sessions or lines may be allocated unequally for different lines (e.g., giving preference to a primary line, a parent's line, an APN type, etc.). For example, values in APN AMBR fields 540 may be allocated such that the combined APN AMBR for sessions of an active primary subscriber is always allocated at least 50% of the value in account AMBR field 550. The allocation between the primary subscriber and other (e.g. secondary) subscribers (or primary APN types and other APN types) may be indicated, for example, in a user-defined preference stored in a user profile of PCRF 116 or HSS 120.

PCRF 116 may dynamically add entries to data structure 500 (e.g., for other active devices or sessions under the account) or delete entries from data structure 500 (e.g., for deactivated devices or terminated sessions), resulting in changes to the values in APN AMBR fields 540 in the remaining entries 560-563.

Although FIGS. 5A-5E shows exemplary information that may be provided in data structure 500 for MBR management database 124, in other implementations, data structure 500 may contain less, different, differently-arranged, or additional information than depicted in FIGS. 5A-5E. For example, data structure 400 may take the form of a spreadsheet, a table, a flat data structure, etc.

Figure 6:
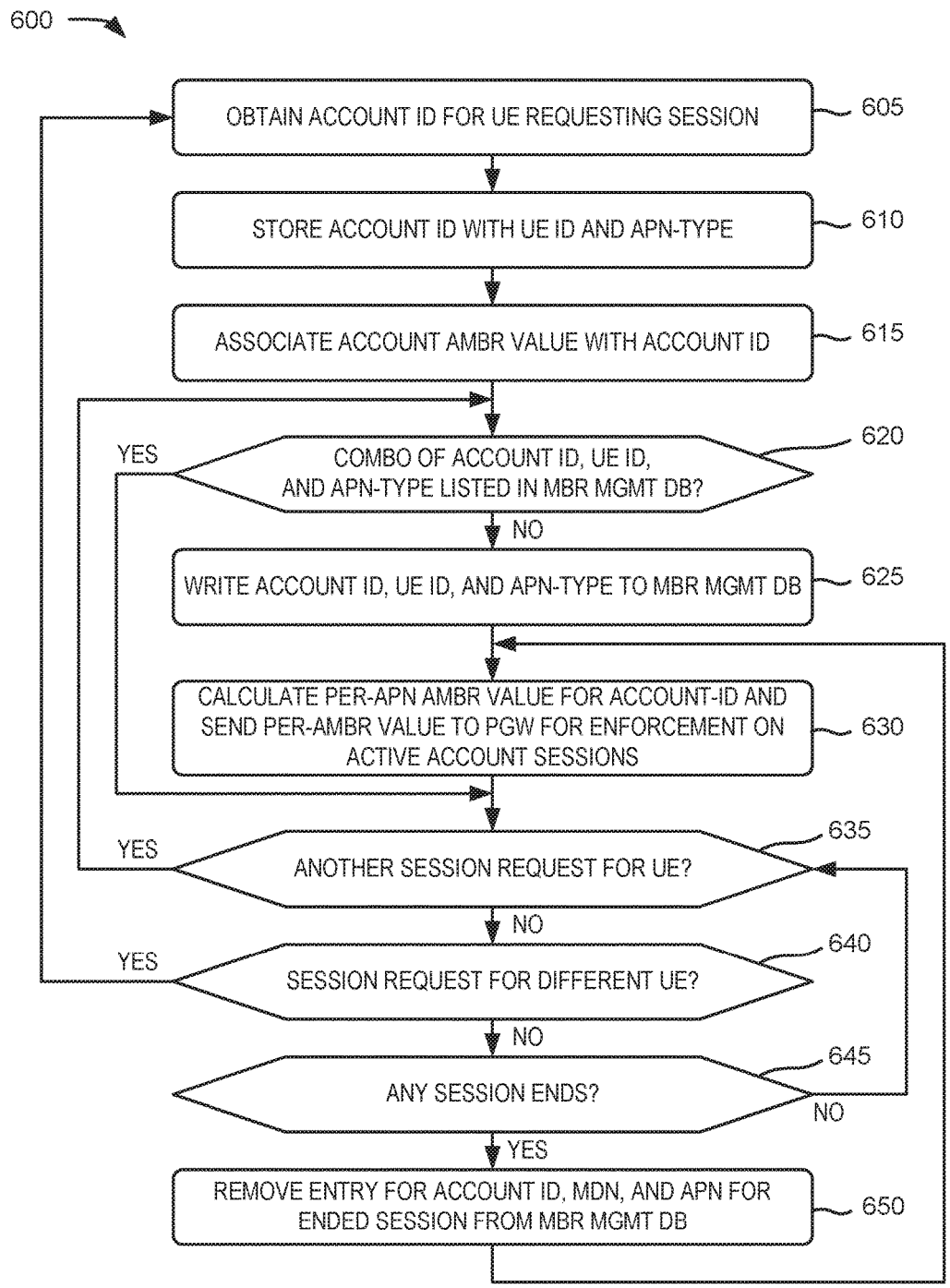
FIG. 6 is a flow chart showing an exemplary process for implementing account level data speed enforcement, according to an implementation described herein.

FIG. 6 provides a flow chart showing an exemplary process for implementing account-level data speed enforcement. In one implementation, process 600 may be performed on a network device, such as PCRF 116. In another implementation, process 600 may be performed by PCRF 116 in conjunction with one or more other devices, such as PGW 114 or OCS 122.

Process 600 may include obtaining an account identifier for a UE requesting a session (block 605) and storing the account ID with a UE identifier and an APN identifier for the requested session (block 610). For example, as described in connection with FIG. 4, PCRF 116 may submit a SLR message 410. OCS 122 may respond by providing to PCRF 116 corresponding SLA message 415 that includes an account identifier for UE 150. Additionally, or alternatively, OCS 122 may send to PCRF 116 an SNR message 415 that includes the account identifier for UE 150. In one implementation, the account identifier may be included within an AVP. PCRF 116 may store the account identifier received from OCS 122.

Process 600 may further include associating an account AMBR value with the account identifier (block 615), and determining if the combination of the account identifier, UE identifier, and APN identifier is listed in a MBR management database (block 620). For example, PCRF 116 may determine an MBR assigned to the account based on communications with HSS 120 or default settings. PCRF 116 may check MBR management database 124 to confirm an entry for the combination of account identifier, UE identifier, and APN identifier is not already listed (e.g., previously added by another PCRF, etc.).

If the combination is not listed in the MBR management database (block 620—NO), process 600 may include writing a new entry with the account identifier, UE identifier, and APN identifier into the MBR management database (block 625), and calculating a per-APN AMBR value for the account identifier and sending the per-AMBR value to a PGW 114 for enforcement on active account sessions (block 630). For example, as described above in connection with FIG. 5A, PCRF 116 may write entry 560 to MBR management database 124 for the particular combination of account identifier, UE identifier, and APN identifier. PCRF 116 may allocate a subset of the total MBR for the account to an APN-AMBR for each active session listed in MBR management database 124.

After calculating the per-APN AMBR value or if the combination is listed in the MBR management database (block 620—YES), process 600 may include determining if another session is requested for the UE (block 635). For example, referring to FIG. 5B, after entry 560 is complete, UE 150-1 may request another session with a different APN identifier.

If another session is requested for the UE (block 635—YES), process 600 may return to block 620 to determine if the combination of the account identifier, UE identifier, and APN identifier is listed in the MBR management database 124. If another session is not requested for the UE (block 635—NO), process 600 may include determining if there is a session request for a different UE (block 640). For example, as shown in FIG. 5C, after entry 561 is complete, UE 150-2 may request a session.

If there is a session request for a different UE (block 640—YES), process 600 may return to block 605 to obtain an account identifier for the UE. If there is not a session request for a different UE (block 640—NO), process 600 may include determining if any active sessions has ended (block 645). For example, PCRF 116 may receive an indication that a particular session for a UE 150 has been terminated or that multiple sessions have been terminated (e.g., due to detachment of UE 150 from ePC network 110).

If no active session has ended (block 645—NO), process 600 may return to block 635 to determine if another session is requested for the UE. If an active session has ended (block 645—YES), process 600 may include removing a corresponding entry with the combination of the account identifier, UE identifier, and APN identifier from the MBR management database (block 650). For example, PCRF 116 may dynamically delete entries from MBR management database 124 for deactivated devices or terminated sessions, resulting in changes to the values in APN AMBR fields 540 in the remaining entries 560-563.

Figure 7A:
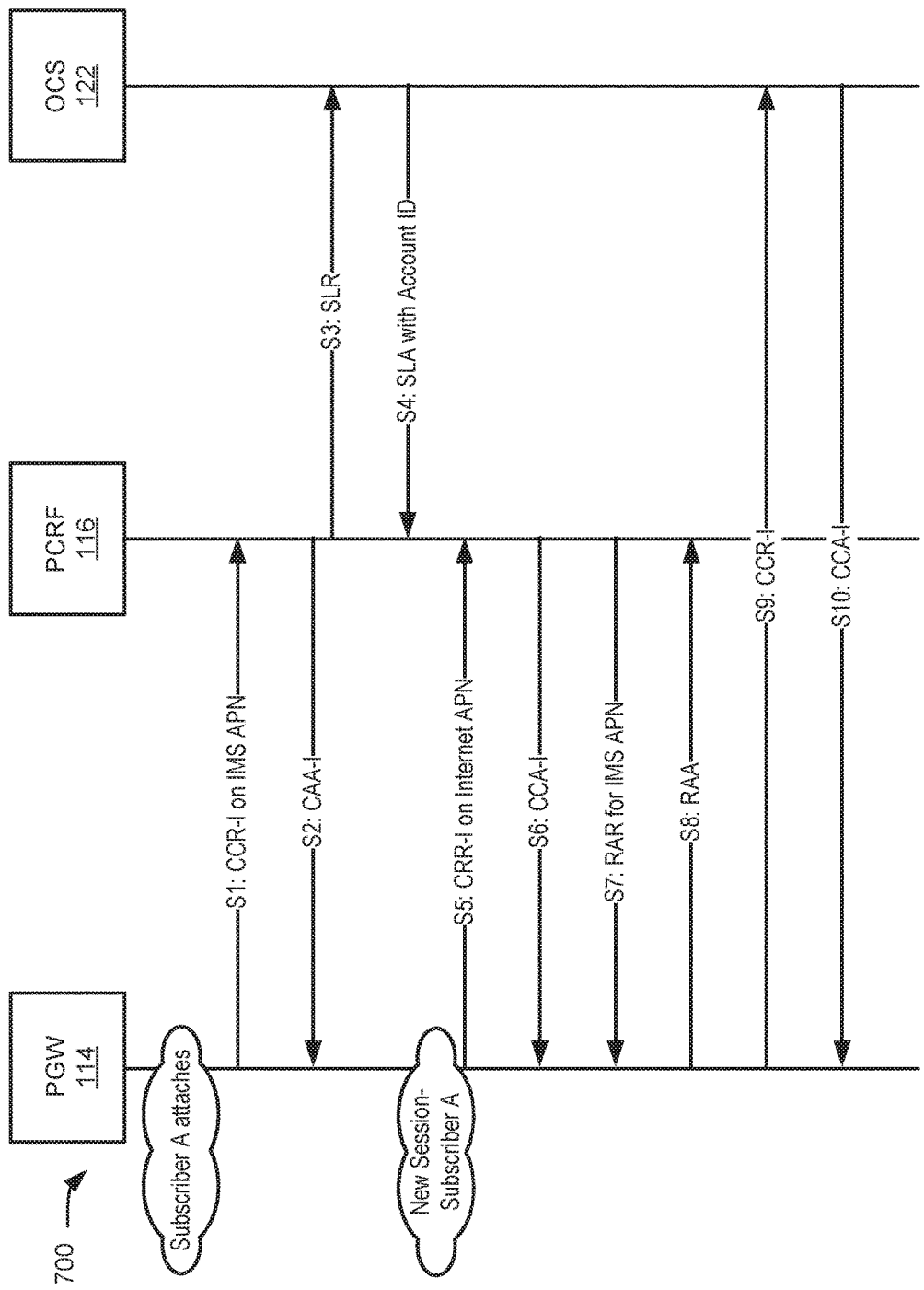

FIGS. 7A-7D illustrate communications for a use case for implementing account-level data speed enforcement for two UE under the same account. As shown in FIG. 7A, a subscriber A (e.g., using UE 150-1) attaches to ePC network 110 and initiates an IMS session. At step S1, PGW 114 sends an initial credit control request (CCR-I) to PCRF 116 on the Gx interface 127. At step S2, PCRF 116 provides an initial credit control answer (CCA-I) to instruct PGW 114 to install rules and setup the APN-AMBR to be on full data speed (e.g., 75 Mbps).

At step S3, PCRF 116 initiates an Sy interface session with OCS 122 and provides an SLR message to OCS 122. At step S4, OCS 122 returns an SLA message with a policy counter status and an OCS-Account-ID for subscriber A, which indicates the account has not yet reached a throttling threshold.

At step S5, subscriber A initiates an internet session, and PGW 114 send another CCR-I to PCRF 116 on the Gx interface. At step S6, PCRF 116 detects there are now two APN sessions in progress under subscriber A, PCRF 116 provides a CCA-I to instruct PGW 114 to install rules and setup the APN-AMBR to 37.5 Mbps for the internet APN. At step S7, PCRF 116 sends a re-authorization request (RAR) to subscriber A's IMS session to update APN-AMBR from 75 Mbps to 37.5 Mbps. At step S8, PGW 114 provides a re-authorization answer (RAA) and enforces the new APN-AMBR of 37.5 Mbps for subscriber A's IMS session. At step S9, PGW 114 sends a CCR-I to OCS 122 via the Gy interface 126 to request a quota for subscriber A. At step S10, OCS 122 returns a CCA-I with the quota.

Figure 7B:
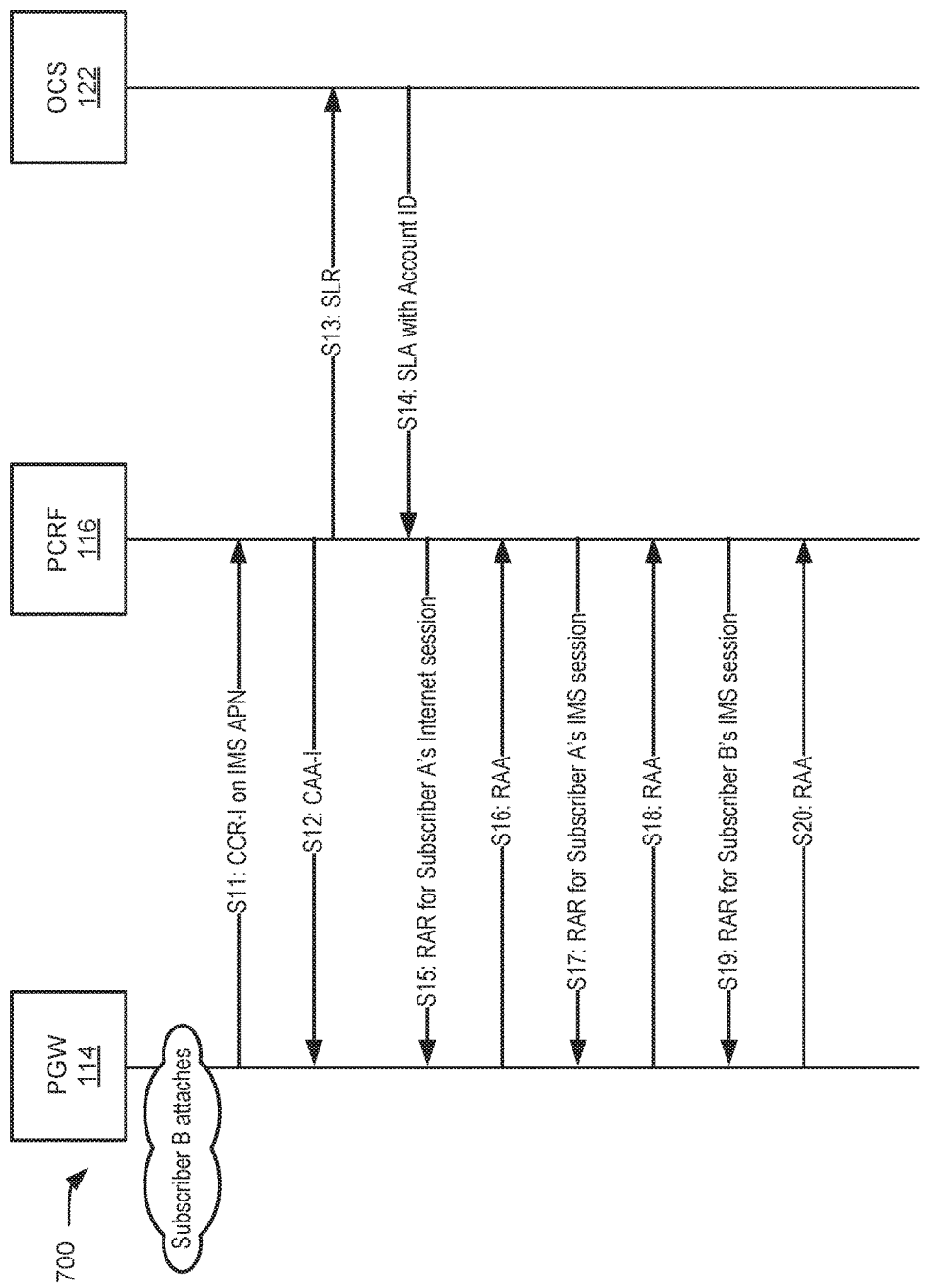

Referring to FIG. 7B, another subscriber B (e.g., using UE 150-2) attaches to ePC network 110 and initiates an IMS session. At step S11, PGW 114 sends an initial credit control request (CCR-I) to PCRF 116 on the Gx interface 127. PCRF 116 has no account ID information for subscriber B at this point. Thus, at step S12, PCRF 116 provides a CCA-I to instruct PGW 114 to install rules and setup the APN-AMBR to be on full data speed (e.g., 75 Mbps).

At step S13, PCRF 116 initiates an Sy interface session with OCS 122 and provides an SLR message to OCS 122. At step S14, OCS 122 returns an SLA message with a policy counter status and an OCS-Account-ID for subscriber B, which indicates subscriber B and subscriber A are in the same account. PCRF 116 can this manage the MBR for subscribers A and B at the account level. PCRF 116 determines there are now three APN sessions in progress under the account for subscribers A and B.

At step S15, PCRF 116 sends an RAR to subscriber A's internet session to dynamically update the APN-AMBR from 37.5 Mbps to 25 Mbps. At step S16, PGW 114 sends an RAA and enforces the new APN-AMBR of 25 Mbps for subscriber A's internet session. At step S17, PCRF 116 sends an RAR to subscriber A's IMS session to dynamically update the APN-AMBR from 37.5 Mbps to 25 Mbps. At step S18, PGW 114 sends an RAA and enforces the new APN-AMBR of 25 Mbps for subscriber A's IMS session. At step S19, PCRF 116 sends an RAR to subscriber B's IMS session to dynamically update the APN-AMBR from 37.5 Mbps to 25 Mbps. At step S20, PGW 114 sends an RAA and enforces the new APN-AMBR of 25 Mbps for subscriber B's IMS session.

Referring to FIG. 7C, at step S21, subscriber B initiates an internet session, and PGW 114 sends another CCR-I to PCRF 116 on the Gx interface 127. At step S22, PCRF 116 detects there are now four APN sessions in progress under the account for subscribers A and B. PCRF 116 provides a CCA-I to instruct PGW 114 to install rules and setup the APN-AMBR to 18.75 Mbps for the internet APN for subscriber B.

At step S23, PCRF 116 sends an RAR to subscriber A's internet session to dynamically update the APN-AMBR from 25 Mbps to 18.75 Mbps. At step S24, PGW 114 sends an RAA and enforces the new APN-AMBR of 18.75 Mbps for subscriber A's internet session. At step S25, PCRF 116 sends an RAR to subscriber A's IMS session to dynamically update the APN-AMBR from 25 Mbps to 18.75 Mbps. At step S26, PGW 114 sends an RAA and enforces the new APN-AMBR of 18.75 Mbps for subscriber A's IMS session. At step S27, PCRF 116 sends an RAR to subscriber B's IMS session to dynamically update the APN-AMBR from 25 Mbps to 18.75 Mbps. At step S28, PGW 114 sends an RAA and enforces the new APN-AMBR of 18.75 Mbps for subscriber B's IMS session.

At step S29, PGW 114 sends a CCR-I over the Gy interface 126 to OCS 122 to request a quota for subscriber B's internet session. At step S30, OCS 122 returns a CCA-I with the quota.

Figure 7D:
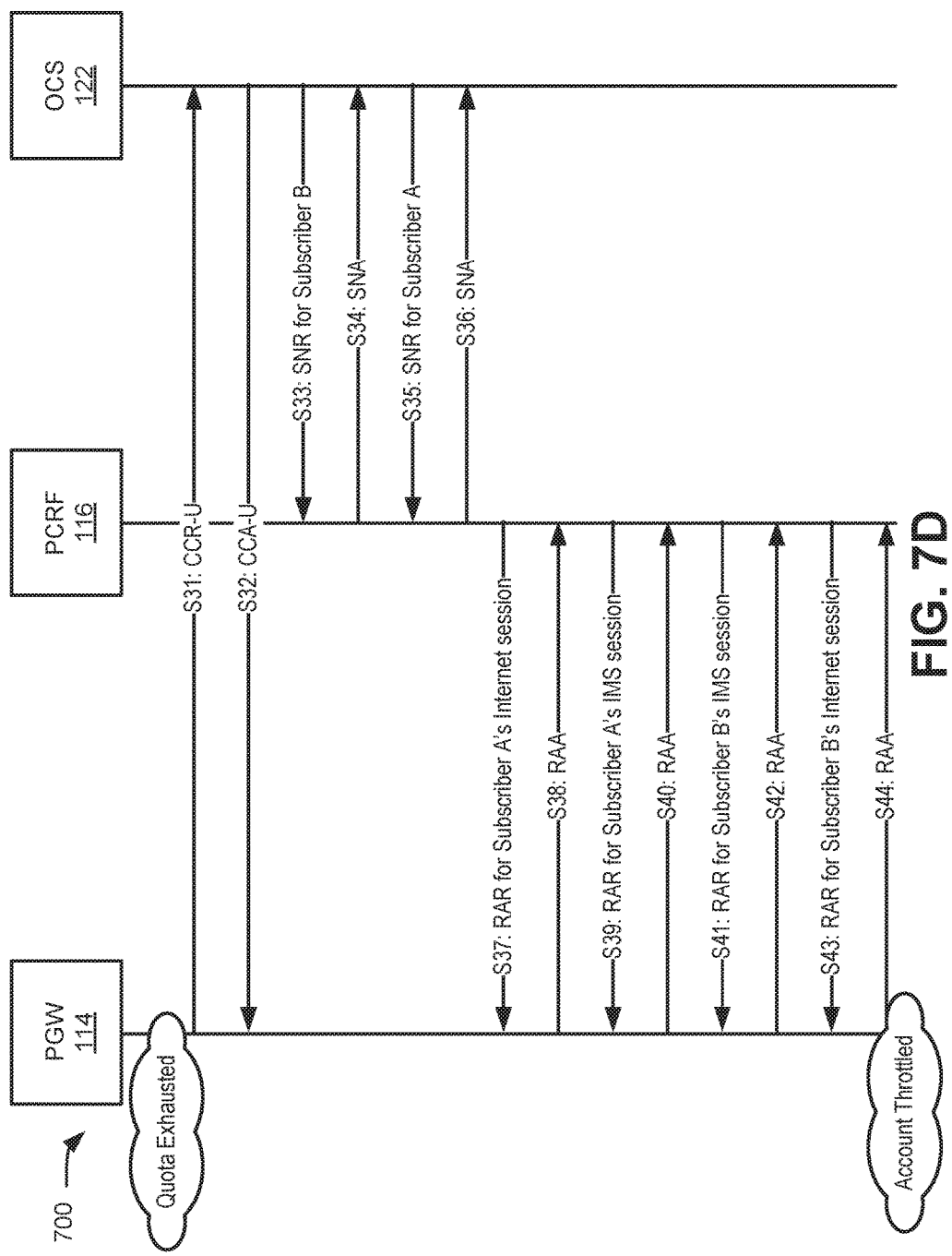

Referring to FIG. 7D, at step S31, when the Gy quota is exhausted, PGW 114 sends an updated CCR (CCR-U) to OCS 122 to request a quota for subscriber B's internet session. At step S32, OCS 122 determines that the whole account has reached the throttling threshold. Thus, the whole account will be put on a low data speed. At step S33, OCS 122 sends an SNR message 415 to PCRF 116 to notify subscriber B will be put on low speed. At step S34, PCRF 116 sends an SNA 410 to acknowledge the request. At step S35, OCS 122 sends an SNR message to PCRF 116 to notify subscriber A will be put on low speed. At step S36, PCRF 116 sends an SNA to acknowledge the request.

At step S37, PCRF 116 sends an RAR to subscriber A's internet session to dynamically update the APN-AMBR from 18.75 Mbps to 250 Kbps. At step S38, PGW 114 sends an RAA and enforces the new APN-AMBR of 250 Kbps for subscriber A's internet session. At step S39, PCRF 116 sends an RAR to subscriber A's IMS session to dynamically update the APN-AMBR from 18.75 Mbps to 250 Kbps. At step S40, PGW 114 sends an RAA and enforces the new APN-AMBR of 250 Kbps for subscriber A's IMS session. At step S41, PCRF 116 sends an RAR to subscriber B's IMS session to dynamically update the APN-AMBR from 18.75 Mbps to 250 Kbps. At step S42, PGW 114 sends an RAA and enforces the new APN-AMBR of 250 Kbps for subscriber B's IMS session. At step S43, PCRF 116 sends an RAR to subscriber B's internet session to dynamically update the APN-AMBR from 18.75 Mbps to 250 Kbps. At step S44, PGW 114 sends an RAA and enforces the new APN-AMBR of 250 Kbps for subscriber B's internet session. Thus, all active sessions for subscribers A and B are throttled.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIG. 6 and signal flows with respect to FIGS. 7A-7D, the order of the blocks and/or signal flows may be modified in other embodiments. Further, non-dependent blocks may be performed in parallel.

Certain features described above may be implemented as "logic," a "module," or a "unit" that performs one or more functions. This logic, module, or unit may include hardware, such as one or more processors, microprocessors, application specific integrated circuits, or field programmable gate arrays, software, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise. The term "exemplary," as used herein means "serving as an example." Any embodiment or implementation described as "exemplary" is not necessarily to be construed as preferred or advantageous over other embodiments or implementations.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining, by a policy and charging rules function (PCRF) device, an account identifier for a user device requesting a session over a wireless network, wherein the account identifier applies to multiple user devices that share an aggregate maximum bit rate (AMBR) among the multiple user devices;
   storing, by the PCRF device, the account identifier associated with a user device identifier for the user device and an access point name (APN) identifier for the session;
   associating, by the PCRF device, the account identifier with an account AMBR value;
   storing, by the PCRF device and in a memory, an entry including the account identifier, the user device identifier, and the APN identifier;
   calculating, by the PCRF device, a per-APN AMBR value for the session, wherein the per-APN AMBR value comprises a portion of the account AMBR value allocated to the user device among other active user devices of the multiple user devices with the account identifier;
   sending, by the PCRF device and to a packet data network (PDN) gateway (PGW) device, the per-APN AMBR value for the session requested by the user device;
   receiving, by the PCRF device and from an online charging system (OCS) device, a throttling indication for the account identifier;
   updating, by the PCRF device, the memory to reflect a throttled account AMBR value shared among the multiple user devices with the account identifier; and
   re-calculating, by the PCRF device, an adjusted per-APN AMBR value for the user device as a portion of the throttled account AMBR value shared among the multiple user devices.

2. The method of claim 1, further comprising:
   sending, by the PCRF device and to the PGW device, the adjusted per-APN AMBR value for the session.

3. The method of claim 1, wherein the obtaining includes receiving, from an OCS device, the account identifier.

4. The method of claim 3, wherein the account identifier in included within an attribute value pair (AVP) for one of a Spending-Limit-Answer (SLA) message or a Spending-Status-Notification-Answer (SNA) message.

5. The method of claim 1, wherein the obtaining includes providing, by the PCRF device, a request via a Sy interface.

6. The method of claim 1, further comprising:
   receiving, by the PCRF device, the account identifier associated with another user device requesting another session over the wireless network;
   storing, by the PCRF device, the account identifier associated with another user device identifier for the other user device and another APN identifier for the other session;
   storing, by the PCRF device and in a database, an entry including the account identifier, the other user device identifier, or the other APN identifier;
   calculating, by the PCRF device and based on the account AMBR value, a first updated per-APN AMBR value for the session and a second updated per-APN AMBR value for the other session;
   sending, by the PCRF device and to the PGW device, the first updated per-APN AMBR value for the session requested by the user device; and
   sending, by the PCRF device and to the PGW device, the second updated per-APN AMBR value for the other session requested by the other user device.

7. The method of claim 1, wherein the memory comprises a centralized database accessible by multiple PCRF devices.

8. The method of claim 1, wherein the memory comprises a distributed database that is synchronized among multiple PCRF devices.

9. The method of claim 1, wherein the calculating comprises identifying, from the memory, a total number of active entries in a list of multiple user devices, with the same account identifier and allocating separate per-APN AMBR values, for each of the active entries, from the account AMBR value.

10. A network device, comprising:
an interface that communicates with a network;
a memory configured to store instructions; and
a processor, coupled to the interface and the memory, wherein the processor is configured to execute the instructions stored in the memory to:
obtain an account identifier for a user device requesting a session over a wireless network, wherein the account identifier applies to multiple user devices that share an aggregate maximum bit rate (AMBR) among the multiple user devices;
store the account identifier associated with a user device identifier for the user device and an access point name (APN) identifier for the session;
associate the account identifier with an account AMBR value;
store, in the memory, an entry including the account identifier, the user device identifier, and the APN identifier;
calculate a per-APN AMBR value for the session, wherein the per-APN AMBR value allocates a portion of the account AMBR value for the user device among other active user devices of the multiple user devices with the account AMBR;
send, to a packet data network (PDN) gateway (PGW) device, the per-APN AMBR value for the session requested by the user device;
receive, from an online charging system (OCS) device, a throttling indication for the account identifier;
update the memory to reflect a throttled account AMBR value shared among the multiple user devices; and
re-calculate an adjusted per-APN AMBR value for the user device as a portion of the throttled account AMBR value shared among the multiple user devices.

11. The network device of claim 10, wherein the processor is further configured to execute the instructions stored in the memory to:
send, to the PGW device, the adjusted per-APN AMBR value for the session.

12. The network device of claim 10, wherein the account identifier in included within a Spending-Limit-Answer (SLA) message or a Spending-Status-Notification-Answer (SNA) message.

13. The network device of claim 10, wherein the network device includes a Policy and Charging Rules Function (PCRF) device in a Long Term Evolution (LTE) network.

14. The network device of claim 10, wherein the memory is a centralized database accessible by multiple other PCRF devices.

15. The network device of claim 10, wherein, when calculating the per-APN AMBR value for the session, the processor is further configured to execute the instructions stored in the memory to:
identify, from the memory, a total number of active entries with the same account identifier and divide the account AMBR value among each entry.

16. The network device of claim 10, wherein, when obtaining the account identifier, the processor is further configured to execute the instructions stored in the memory to:
provide a request to an online charging system (OCS) via an Sy interface; and
receive the account identifier from the OCS via the Sy interface.

17. A non-transitory computer-readable medium, storing instructions executable by one or more processors, the non-transitory computer-readable medium comprising one or more instructions to:
obtain an account identifier for a user device requesting a session over a wireless network, wherein the account identifier applies to multiple user devices that share an aggregate maximum bit rate (AMBR) among the multiple user devices;
store the account identifier associated with a user device identifier for the user device and an access point name (APN) identifier for the session;
associate the account identifier with an account AMBR value;
store, in a memory, an entry including the account identifier, the user device identifier, and the APN identifier;
calculate a per-APN AMBR value for the session, wherein the per-APN AMBR value allocates a portion of the account AMBR value for the user device among other active user devices of the multiple user devices that share the account AMBR; and
send, to a packet data network (PDN) gateway (PGW) device, the per-APN AMBR value for the session requested by the user device;
receive the account identifier associated with another user device requesting another session over the wireless network;
store the account identifier associated with another user device identifier for the other user device and another APN identifier for the other session;
store, in a database, an entry including the account identifier, the other user device identifier, or the other APN identifier;
calculate, based on the account AMBR value, a first updated per-APN AMBR value for the session and a second updated per-APN AMBR value for the other session;
send, to the PGW device, the first updated per-APN AMBR value for the session requested by the user device; and
send, to the PGW device, the second updated per-APN AMBR value for the other session requested by the other user device;
end, to the PGW device, the adjusted per-APN AMBR value for the session.

18. The non-transitory computer-readable medium of claim 17, wherein the instructions to obtain the account identifier further comprise one or more instructions to:
provide a request to an online charging system (OCS) device via an Sy interface; and
receive the account identifier from the OCS device via the Sy interface.

19. The non-transitory computer-readable medium of claim 17, further comprising one or more instructions to:
receive, from an online charging system (OCS) device, a throttling indication for the account identifier;
update a database to reflect a throttled account AMBR value shared among the multiple user devices;
re-calculate an adjusted per-APN AMBR value for the user device as a portion of the throttled account AMBR value shared among the multiple user devices; and
send, to the PGW device, the adjusted per-APN AMBR value for the session.

20. The non-transitory computer-readable medium of claim 17, wherein the instructions to obtain the account identifier further comprise one or more instructions to:
- extract the account identifier from an attribute value pair (AVP) in one of a Spending-Limit-Answer (SLA) message or a Spending-Status-Notification-Answer (SNA) message.

* * * * *